United States Patent [19]
Aiger et al.

[11] Patent Number: 5,956,418
[45] Date of Patent: Sep. 21, 1999

[54] METHOD OF MOSAICING ULTRASONIC VOLUMES FOR VISUAL SIMULATION

[75] Inventors: Dror Aiger, Kfar Sava; Daniel Cohen-Or, Tel Aviv, both of Israel

[73] Assignee: Medsim Ltd., Kfar Sava, Israel

[21] Appl. No.: 08/763,577

[22] Filed: Dec. 10, 1996

[51] Int. Cl.[6] ........................................... G06T 3/00
[52] U.S. Cl. ............................... 382/154; 382/294
[58] Field of Search ................................ 382/294, 293, 382/291, 284, 215, 216, 209, 154; 358/450; 395/136

[56] References Cited

U.S. PATENT DOCUMENTS

| | | |
|---|---|---|
| 4,590,607 | 5/1986 | Kauth . |
| 4,644,582 | 2/1987 | Morishita et al. . |
| 4,899,393 | 2/1990 | Morishita et al. . |
| 5,173,946 | 12/1992 | Rao . |
| 5,531,520 | 7/1996 | Grimson et al. ............ 382/294 |
| 5,550,937 | 8/1996 | Bell et al. ................... 382/294 |
| 5,575,286 | 11/1996 | Weng et al. ................. 600/444 |
| 5,611,033 | 3/1997 | Pitteloud et al. ............ 358/450 |
| 5,633,951 | 5/1997 | Moshfeghi ................... 382/294 |
| 5,657,402 | 8/1997 | Bender et al. ............... 382/294 |
| 5,850,486 | 3/1996 | Maas, III et al. ............ 382/294 |

OTHER PUBLICATIONS

Lin et al. "Inter–Subject MR–PET Image Registration and Integration" Nuclear Science Symposium, Conference Record, pp. 1908–1912, Nov. 9, 1996.

Moshfeghi et al. "Three–Dimensional Elastic Matching of Volumes" IEEE Transactions on Image Processing, vol. 3, No. 2, pp. 128–138, Mar. 1994.

Barber, D.C., "Registration of Low Resolution Medical Images", Phys. Med. Biol., vol. 37, No. 7, pp. 1485–1498 (1992).

*Primary Examiner*—Amelia Au
*Assistant Examiner*—Larry J. Prikockis
*Attorney, Agent, or Firm*—Mark M. Friedman

[57] ABSTRACT

A method for mosaicing medical images, particularly volumes acquired by a 3D ultrasound device. The method relies on an image-based technique that transforms a target volume to align with a reference volume. The transformation is composed of a coarse rigid transformation and a fine elastic warp. The fine transformation assumes that the two volumes are close enough for the mapping between them to be expressed in terms of their gradient values.

3 Claims, 5 Drawing Sheets

METHOD OF MOSAICING ULTRASONIC VOLUMES FOR VISUAL SIMULATION

FIELD AND BACKGROUND OF THE INVENTION

The present invention relates to image processing for medical imaging and, more particularly, to a method for registering images, especially ultrasound images, of a patient, acquired from several viewpoints.

The problem addressed by the present invention is that of mosaicing a large volume from a set of small volumes acquired from a 3D ultrasound device. The formation of large volumes is necessary for an ultrasound visual simulator, such as the one described in U.S. patent application Ser. No. 08/316,841. Trainees using the simulator are able to learn how to identify and diagnose a wide range of medical cases, including rare pathologies, by operating a simulated ultrasound device on a mannequin, without any need for actual patients. The principle of the simulator is simple but effective. In an off-line preprocess, a volume buffer is generated from real ultrasound images, and then the simulated images are generated by slicing the volume buffer on-line. Such images can be generated very rapidly, including postprocessing enhancements, and can produce images which are, in most cases, indistinguishable from real ultrasound images.

The ultrasonic volume buffer has to be big enough, and has to represent a large portion of the mannequin, to permit the unbounded practice of a real life diagnosis. Contemporary ultrasound devices do not provide the capability of obtaining the entire volume in a single acquisition. This implies that the volume buffer has to be reconstructed from several sub-volumes obtained from different viewpoints. The registration of mono-modal datasets has been extensively investigated in medical applications where atlas data are used. However, ultrasonic datasets are far more problematic than other medical modalities, such as CT or MRI, because the ultrasound values are significantly more noisy, blurred, deformed, and have view dependent variations which are described below.

The basic technique of a mosaicing operation is to align and register two given volumes with a significant overlap into a single volume which smoothly combines the information from both. The type of registration technique that can be appropriately applied is directly dependent on the type of variation between the two volumes. Thus, to design a registration method for ultrasonic volumes, it is necessary to know the type of variation exhibited by ultrasonic volumes.

The typical size of an ultrasound image generated by common ultrasonic devices is limited to a maximum width of 12-15 cm. The acquisition of a volume is therefore reconstructed from a series of two-dimensional slices. There are two main methods of collecting the series of slices: a free-hand collection and a mechanical collection. In a free-hand collection the location and orientation of the slice is tracked by a six-degree-of-freedom device. The slices are stored in the volume and the gaps between the slices are filled by interpolation. This method is impractical for large volumes because of the long acquisition time and the inaccuracy caused by the numerous unsampled gaps.

A better approach is to attach the transducer probe to a mechanical motor that sweeps the slice along some type of trajectory (e.g., fan, rotation). In particular, with a parallel sweep, a series of parallel slices are obtained with no inter-slice gaps. The desired image resolution may be obtained by sweeping the slice sufficiently slowly. Such parallel dense slices provide small volumes of good quality. A series of such volumes needs to be collected and assembled to form a large volume.

The registration of two volumes requires the detection of the changes between the two images and the design of a transformation that deforms the images in order to remove or reduce the variations between them. The source variations can be classified into the following three types.

1. Directional Variations

These variations are due to changes in the view point. They cause a misalignment that can be simply corrected by a rigid transformation. However, as we noted above, the acquisition of the same volume from a different view point causes other effects that are not compensated for by spatial transformation. For example, shadows are cast with a strong correlation with the probe viewing direction.

2. Volumetric Variations

These are caused by the characteristics of ultrasonic technology, for example, depth gain compensation and gain distortions, and the inherently noisy and blurred ultrasound signal. These effects are difficult to model and to remove. One can attempt to reduce them by tuning the acquisition parameters.

3. Geometric Variations

Geometric deformations are caused by the movements of the body of the patient during acquisition. Some movements are forced by the acquisition device, because the ultrasound probe must have good contact with the body. The human body is soft and not flat, and it is rather difficult to maintain contact without causing the patient's muscles to contract.

Another unavoidable deformation is caused by breathing and other natural behavior of the patient. Periodic deformation (like that of the heart) can be overcome by "gating". In gating, the acquisition is synchronized with the period of the deformation, and the slices are acquired in phase with the deformation, using equipment similar to E.C.G. that monitors heart activity.

In most cases, the registration of ultrasound images cannot be based on image features. In ultrasonic data, it would be very difficult for even a human expert, let alone an automatic procedure, to identify useful features, because 3D features can appear significantly different in two different images. Therefore, a technique for registering ultrasound images must be based directly on image pixel values, and not on the interpretation of those values. A reasonable strategy would be to base the registration technique on some "majority". That is, the success of the technique depends on the average success over the whole image, even though part of the image may not contain any useful information. Such techniques are classified as automatic direct registration techniques. One such technique, for two dimensional images, was published by Barber (D. C. Barber (1992), Registration of low resolution medical images, Phys. Med. Biol., vol. 37 no. 7, pp. 1485–1498, which is incorporated by reference for all purposes as if fully set forth herein). Barber's technique is not directly suitable for use with ultrasound data sets, however, because of the unique characteristics of ultrasound data sets noted above.

There is thus a widely recognized need for, and it would be highly desirable to have, a method for automatic direct registration of ultrasound images.

SUMMARY OF THE INVENTION

According to the present invention there is provided a method for warping an input target image to match an input reference image, both images being at an original level of resolution, both images being composed of a plurality of pixels, the method comprising the steps of: (a) convolving the input target image with a low pass filter, thereby obtaining a filtered target image; (b) convolving the input reference image with said low pass filter, thereby obtaining a filtered reference image; (c) subsampling said filtered target image, thereby obtaining a subsampled target image; (d) subsampling said filtered reference image, thereby obtaining a subsampled reference image; (e) determining an affine transformation that maximizes a normalized cross-correlation between said subsampled target image and said subsampled reference image; and (f) scaling said affine transformation to apply to the original level of resolution, thereby obtaining a scaled factor of said affine transformation.

According to the present invention there is provided a method for warping an input target image to match an input reference image, both images being of a dimensionality D, both images being at an original level of resolution, both images being composed of a plurality of pixels, the method comprising the steps of: (a) subdividing the input target image into a plurality of target subimages; (b) subdividing the input reference image into a plurality of reference subimages, there being a one-to-one correspondence between said reference subimages and said target subimages; (c) for each of said target subimages, determining a local transformation that warps said target subimage to match said corresponding reference subimage.

According to the present invention there is provided a method for blending a three-dimensional target image with a three-dimensional reference image, the target image including a plurality of points, the method comprising the steps of: (a) determining at least one seam plane shared by the target image and the reference image; (b) for each of said at least one seam plane: (i) extracting an input target slice from the target image along said seam plane, (ii) extracting an input reference slice from the reference image along said seam plane, (iii) subdividing the input target slice into a plurality of target subslices, (iv) subdividing the input reference slice into a plurality of reference subslices, there being a one-to-one correspondence between said reference subslices and said target subslices, (v) for each of said target subslices, determining a local transformation that warps said target subimage to match said corresponding reference subimage, (vi) recursively performing both said subdividing and said determining of said local transformation at a plurality of levels of localization, said recursion further including the steps of: (A) for each of said target subslices, composing said local transformation with a prior transformation, thereby obtaining a local composed transformation, and (B) forming a weighted sum of said local composed transformations, thereby obtaining a global transformation; (c) applying a weighted sum of said at least one global transformation to at least one of the points.

The method of the present invention is built on an affine mapping of a target image into a reference image. Because this affine mapping is based on the gradients of the images, it is referred to herein as the "gradient technique". The naive gradient technique is extended herein by two improvements, referred to herein as "multiresolution and localization". The derivations herein are 2D derivations: their extension to 3D and higher dimensions will be obvious to one skilled in the art.

The gradient technique assumes that the misalignment of the two images is not too large. That is, the starting position of the two images is "good enough", where the exact meaning of "good enough" is discussed below. There are other techniques which can register two images with arbitrary partial overlapping. Such techniques usually perform a coarse alignment, possibly by rigid transformation. The present invention includes a partial matching method which applies rigid transformation to bring the two images to a satisfactory starting position for the fine and elastic parts of the registration.

The naive gradient technique finds an affine operator T that transforms the coordinates of the target image into the coordinates of the reference image in a way that maximizes the overlap of the two images. This technique is based on a Taylor expansion of the exact mapping, under the assumption that there is a majority of target pixels which are close enough to the corresponding positions in the reference image. The Taylor expansion requires, as its input, gradients of the images These gradients are approximated numerically. Whenever the displacement is large, however, the Taylor expansion is no longer valid. Barber suggested a technique to converge to the solution by iterations. The series of transformations are computed, where at each step k the solution for $T^k$ is found over an image warped by the previous transformation $T^{k-1}$. The transformations must include some filtering and not cause unnecessary loss of information. To minimize applying many transformations, Barber suggested composing the transformations. Because Barber uses bilinear transformations, which are not closed under composition, he approximates his composition by another bilinear transformation.

The solution based on iterations assumes that at each step the majority of pixels contribute a displacement towards the correct solution. However, in many cases in practice, the initial displacement is too large. The present invention includes a multiresolution method to better handle large misalignments. The transformation is computed on a resolution pyramid and the results from the low resolution transformation are used to guide the computation of finer levels. A resolution pyramid consists of the original image and a number of copies of it at lower resolutions. At lower resolutions, adjacent pixels and local gradients represent large distances of the original image. Thus, the low resolution transformation is scaled up according to image resolution. Because all the transformations at all levels are affine transformations, their composition is also an affine transformation. Thus, the final image is a transformation of the original image, and the multiresolution method does not cause any information loss.

Once the final transformation is computed it is applied to the target image. Then, the transformed image is partitioned into four sub-images and the registration process is repeated for each of the sub-images to yield four local transformations which refine the registration locally. This process is recursively repeated for each sub-image and the registration is further refined. The aggregation of the independent local affine transformations forms a global elastic transformation with a high degree of freedom.

The above registration method is static in the sense that all the pixels of the image contribute to the solution. Many pixels may not contain any useful information, or their local environment may not have a matching counterpart in the other image. This situation often occurs in ultrasound images because of hidden parts or noise. Therefore, the present invention includes a rejection mechanism to cull away pixels that are estimated to be irrelevant to the solution. Such pairs of pixels are not assigned to the linear system of equations. This mechanism significantly improves the registration of partially occluded scenes.

As noted above, the present invention relies heavily on the Taylor expansion and the correctness of the gradients. Thus, the images should be continuous and differential, which is not necessarily the case in many discrete images. However, the registration method need not be affected by sharp local variations. Local variations may be softened and blurred by a filter as a preprocess to the gradient calculation. The filter also removes part of the noise from the images and smoothes them. This improves the exactness of the Taylor expansion and hence the quality of the results. However, after the transformation is computed over the filtered images, it is applied to the original images during the mosaicing stage.

BRIEF DESCRIPTION OF THE DRAWINGS

The invention is herein described, by way of example only, with reference to the accompanying drawings, wherein

FIG. 3A is a reference image;

FIG. 3B is a target image to be warped to match the reference image of FIG. 3A;

FIG. 3C is the result of warping the target image of FIG. 3B using a global transformation, including multiresolution;

FIG. 3D is the result of warping the target image of FIG. 3B using one level of localization;

FIG. 3E is the result of warping the target image of FIG. 3B, using two levels of localization;

DESCRIPTION OF THE PREFERRED EMBODIMENTS

Figure 1:
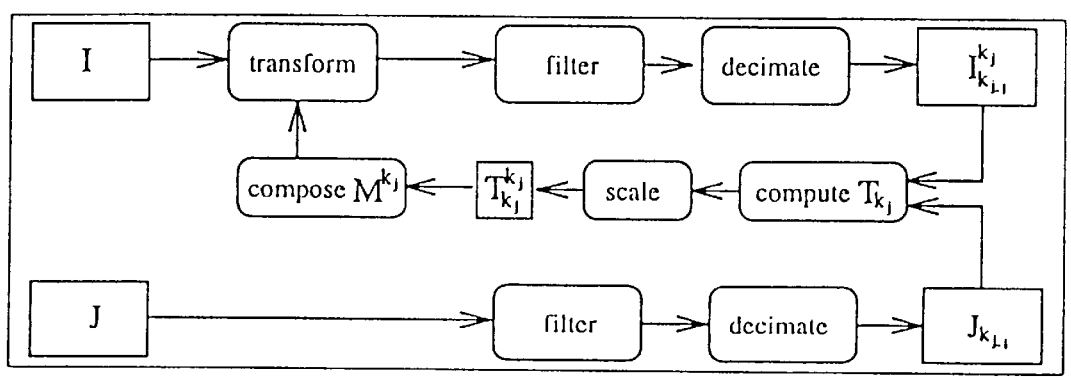
FIG. 1 is a diagram of the data flow of multiresolution registration.

The present invention is of a method for registration of medical images, particularly ultrasound images. Specifically, the present invention can be used to create an internally consistent numerical database of ultrasound images from a collection of disparate, overlapping digital ultrasound subimages.

The principles and operation of medical image registration according to the present invention may be better understood with reference to the drawings and the accompanying description.

The Gradient Method

Given two images, a target image I and a reference image J, the goal is to find a transformation T such that L(T(I,J)) is maximal, where L is the normalized cross-correlation operator $$L(I, J) = \frac{\sum_{x,y}(I(x, y) - \hat{I})(J(x, y) - \hat{J})}{\left(\sum_{x,y}(I(x, y) - \hat{I})^2\right)^{\frac{1}{2}}\left(\sum_{x,y}(J(x, y) - \hat{J})^2\right)^{\frac{1}{2}}} \quad (1)$$

and $\hat{I}$ and $\hat{J}$ are the average values of the target and reference images, respectively. In the development it is assumed that the images are smooth differentiable functions. In the algorithm, a discrete version of the derivatives involved is used.

The transformation T can be defined as a polynomial which maps the x,y coordinates of I to the u,v coordinates of J:

$$u = a_{11} + a_{12}x + a_{13}y + a_{14}x^2 + a_{15}y^2 + a_{16}xy +$$
$$v = a_{21} + a_{22}x + a_{23}y + a_{24}x^2 + a_{25}y^2 + a_{26}xy + \quad (2)$$

In the preferred embodiments of the present invention, an affine transformation is used:

$$u = a_{11} + a_{12}x + a_{13}y$$
$$v = a_{21} + a_{22}x + a_{23}y \quad (3)$$

but other degrees can be used as well. For example, Barber used a bilinear transformation.

To find the coefficients of the affine transformation, a linear system of equations is constructed from a large set of pairs of points $p_i \in I$ and $q_i \in J$. Those point are implicitly described by their displacement, which can be expressed in terms of the transformation.

Let T(x,y)=(u,v). If T warps I onto J, it is assumed that I(xy)=J(u,v) holds for the majority of the image pixels. Define dx=u−x and dy=v−y. Then I(x,y)=J(x+dx, y+dy). Assuming the displacement vector (dx,dy) is small enough to be approximated by the linear term of the Taylor expansion, then $$J(x+dx,y+dy)=J(x,y)+dx\partial_x J(x,y)+dy\partial_y J(x,y) \quad (4)$$

However, because $$dx = u - x = a_{11} + (a_{12}-1)x + a_{13}y$$
$$dy = v - y = a_{21} + a_{22}x + (a_{23}-1)y \quad (5)$$

it follows that $$I(x,y)=J(x,y)+(a_{11}+(a_{12}-1)x+a_{13}y)\partial_x J(x,y)+(a_{21}+a_{22}x+(a_{23}-1)y)\partial_y J(x,y) \quad (6)$$

Assuming that Equation (6) holds for all the pixels in the image, the system of equations can be written in matrix form. Denote by $p_i$ and $q_i$ the values of the target and reference pixels, respectively. Let Q be the vector $\{q_i\}$ and A the vector of unknowns:

$$A=(a_{00},a_{11},(a_{12}-1),a_{13},a_{21},a_{22},(a_{23}-1)) \quad (?)$$

where $a_{00}$ compensates for the amplitude scale of the two images:

$$q_i = a_{00} p_i + \quad (?)$$

The system of equations in Equation (6) can be written in a matrix form:

$$D = \begin{bmatrix} \vdots & \vdots & \vdots & \vdots & \vdots & \vdots & \vdots \\ p_i & \frac{\partial q_i}{\partial x} & x\frac{\partial q_i}{\partial x} & y\frac{\partial q_i}{\partial x} & \frac{\partial q_i}{\partial y} & x\frac{\partial q_i}{\partial y} & y\frac{\partial q_i}{\partial y} \\ \vdots & \vdots & \vdots & \vdots & \vdots & \vdots & \vdots \end{bmatrix} \quad (7)$$

then, ideally, $$Q=DA \quad (8)$$

The system of equations is overdetermined, because there are many more pixels than unknown coefficients in the vector A. Using a least squares technique, A is obtained by a pseudo-inverse method:

$$A=(D^t D)^{-1} D^t Q \quad (9)$$

where $D^t$ is the transpose of matrix D. Because the images are discrete, the partial derivatives are approximated by forward and backward differences:

$$\partial_x I(x,y) \approx (I(x+1,y)-I(x-1,y))/2$$

$$\partial_y I(x,y) \approx (I(x,y+1)-I(x,y-1))/2 \quad (10)$$

Multiresolution

In the following it will be shown how it is possible to exploit multiresolution to improve the registration between two images. Multiresolution improves the performance of the method of the present invention for images whose initial misalignment is rather large. Because the basic method is based on the Taylor expansion, the displacement values must be small enough for the gradient values to be relevant. At lower resolutions, adjacent pixels and local gradients represent large distances of the original image. A displacement computed on a low resolution image corresponds to a larger displacement on the highest resolution of the original image. These larger displacements may yield transformations that compensate for larger misalignments. However, those are only approximate transformations, because they are based on coarse representations of the original images.

A resolution pyramid consists of the original image and several copies of it at lower resolutions. The multiresolution registration is computed on the resolution pyramid, and the results from the low resolution transformation are used to guide the computation of the finer levels. The low resolution displacements and the corresponding transformations are scaled up according to image resolution.

Before the multiresolution method is elaborated, it first is shown how the k-th factor low resolution images are subsampled. Let $I_k$ denote the k-th factor low resolution image of I, a convolution of I with a low-pass filter having a kernel H:

$$I_k(x,y) = \sum_{i=-k/2}^{k/2} \sum_{j=-k/2}^{k/2} i(kx+i, ky+j) H(i,j) \quad (11)$$

A simple box filter $H=1/k^2$ yields satisfactory results.

Homogeneous coordinates are used to represent points. A 2D point is represented by the triple (x,y,w), whose corresponding Cartesian coordinates are (x/w,y/w). Accordingly, an affine transformation such as Equation (3) may be represented by a matrix:

$$B = \begin{bmatrix} b_{11} & b_{12} & t_x \\ b_{21} & b_{22} & t_y \\ 0 & 0 & 1 \end{bmatrix} \quad (12)$$

Given an affine transformation B, its f-th scaled factor $B^f$ is defined as:

$$B^f = \begin{bmatrix} b_{11} & b_{12} & f \times t_x \\ b_{21} & b_{22} & f \times t_y \\ 0 & 0 & 1 \end{bmatrix} \quad (13)$$

and it is easy to verify that if Bp=q, where $p=(p_x,p_y,1)^t$ and $q=(q_x,q_y,1)^t$, then $B^f p^f = q^f$, where $p^f=(f*px, f*py, 1)^t$ and $qf=(f*qx, f*qy, 1)^t$. Thus, if $B_k$ is a transformation between two low resolution images $I_k$ and $J_k$, then $B_k^k$ is an approximation of the transformation between images I and J. That is, $B_k^k \approx B$ and $dB_k \approx dB/k$, where $dB_k$ denotes the displacement values $$dB(x,y,1)=(dx,dy,1)=(x-u,y-v,1),\; B(x,y,1)=(u,v,1) \quad (14)$$

The quality of the approximation depends on the size of the factor k because of the inevitable loss of information in low resolution images.

The multiresolution registration process starts by selecting a scale factor $k_0>1$, where $k_0$ is not too large, so that the scaled down images contain enough information to calculate a meaningful, although coarse, approximation of the transformation between the two images. Denote by I and J the target and reference full scale (input) images, respectively. Let $T_{k_0}$ be the transformation between $I_{k_0}$ and $J_{k_0}$. $T_{k_0}^{k_0}$ is the first coarse approximation for the transformation T between I and J. Denote $I^{k_0}=T_k^{0k_0}(I)$. $I^{k_0}$ is the result of applying the first approximation to the input target image. Now the approximation is refined by applying the method to $I_{k_1}^{k_0}$ and $J_{k_1}$, where $k_1<k_0$, to yield the transformation $T_{k_1}$. The transformations $T_{k_0}^{k_0}$ and $T_{k_1}^{k_1}$ are composed to yield a refined affine mapping $M^{k_1}$ between the original images. This process continues iteratively, such that at each step $T_{k_j}$ is calculated and used to refine $M^{k_j}$:

$$M^{k_j}=T_{k_j}^{k_j} M^{k_{j-1}} \quad (15)$$

Note that $T_{k_j}$ is calculated between $I_{k_j}^{k_{j-1}}$ and $J_{k_j}$, where:

$$I^{k_j}=M^{k_j}(I) \quad (16)$$

Because the affine transformations are closed under composition, $M^{k_j}$ is an affine transformation, and $I^{k_j}$ is a direct mapping of the input image, so that the iterative process does not accumulate errors. The reduction factors $k_i$ can be selected arbitrarily. Preferably, however, the binary reduction, $k_i=k_{i-1}/2$, i>0, is used. This continues until the original resolution is restored. FIG. 1 is a diagram of the data flow of multiresolution registration.

Figure 2A:
FIG. 2A is a reference image.
Figure 2B:
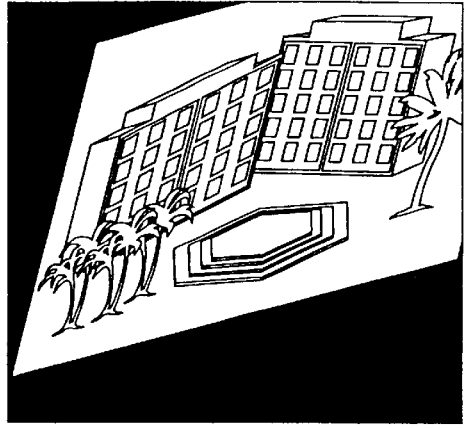
FIG. 2B is a target image to be warped to match the reference image of FIG. 2A.
Figure 2C:
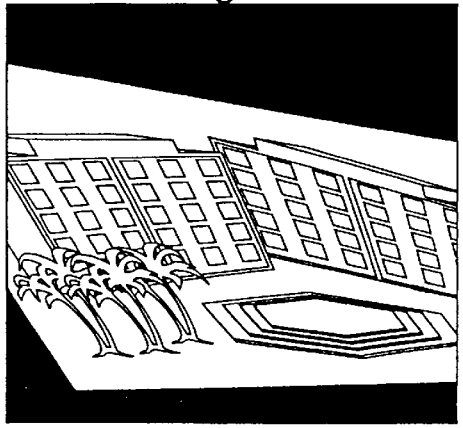
FIG. 2C is the result of warping the target image of FIG. 2B without using multiresolution.
Figure 2D:
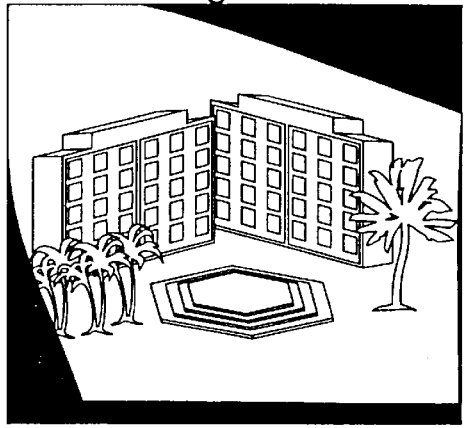
FIG. 2D is the result of warping the target image of FIG. 2B using multiresolution.
Figure 2E:
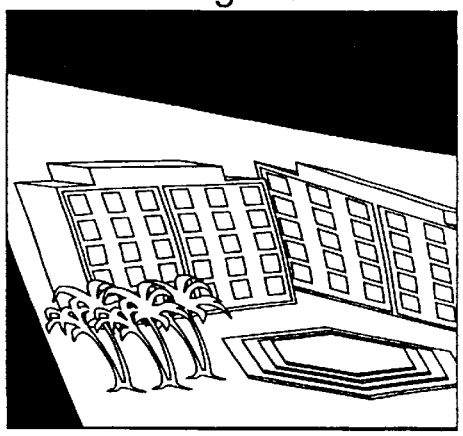
FIG. 2E is the image of FIG. 2B after one multiresolution step.
Figure 2F:
FIG. 2F is the image of FIG. 2B after two multiresolution steps.

The multiresolution method improves the performance of the registration in terms of the initial misalignment of the source and target images. FIGS. 2A through 2F present an example of the use of multiresolution to improve alignment. FIG. 2A is a reference image. FIG. 2B is a target image to be warped to match the reference image of FIG. 2A. Note that FIG. 2B has a small square in its upper left hand corner for reference. FIG. 2C shows the results of warping FIG. 2B using the gradient method without multiresolution. The normalized cross-correlation between FIGS. 2A and 2C is only 0.82. FIG. 2D shows the results of warping FIG. 2B using multiresolution. The normalized cross-correlation between FIGS. 2A and 2D is 0.93. This multiresolution registration was done in three steps. FIG. 2E shows the image of FIG. 2B after one multiresolution step, with a normalized cross-correlation of 0.81 with FIG. 2A. FIG. 2F shows the image of FIG. 2B after two multiresolution steps, with a normalized cross-correlation of 0.91.

Culling

The registration method described above is global in the sense that it considers all the pixels of the source and target images. The solution of the equation system is based on the least squares criterion, in which all the pixel values contribute to the solution. Some of the pixels are irrelevant to the solution, as the corresponding pixels in the other image bear no resemblance to them, or may not even exist. The "vote" of these pixels not only cannot contribute, but may even add noise to the equation system. The present invention includes a rejection process that culls away pixels that are estimated to not contribute to the correct solution. Specifically, a fast local similarity measure is used:

$$E(x, y) = \sum_u \sum_v |I_s(u + x, v + y) - \hat{I}_s - I_t(u + x, v + y) + \hat{I}_t| \quad (17)$$

where $\hat{I}_s$ and $\hat{I}_t$ are the average values in some local neighborhood around $I_s(x,y)$ and $I_t(x,y)$, respectively. A pixel at (x,y) whose similarity value E(xy) is smaller than a given threshold is rejected. Determining an appropriate local neighborhood and an appropriate threshold is straightforward for one ordinarily skilled in the art.

Localization

In most real life cases it is quite rare to find a global polynomial that transforms one image to another. In most cases the transformation characteristic is more general and nonuniform, with different variations over the image. It therefore is necessary to construct the transformation by an aggregation of many local transformations, which define a general elastic transformation. The present invention finds local transformations using the above global registration method over small windows and then interpolates the local transformations to define the global transformation. The localization permits using transformations of low degree, whose combination can define a global elastic transformation of high degree. The present invention preferably uses local affine transformations, taking advantage of the fact that affine transformations are closed under composition.

However, there is a problem of working directly on small areas. A small window in one image is not the transformation of the corresponding window in the other image. This means that it is necessary to deal with partial matching. Moreover, it may occur that images of some windows are mismatched while the entire image matches. Thus, an independent registration between the windows most likely will fail. This suggests the necessity of defining a progressive process in which the registration is defined by a series of refined transformations. In the following, an hierarchical localization and a (weighted) interpolation are introduced. The process is illustrated by the example of FIGS. 3A through 3E.

Figures 3A, 3B, 3C, 3D, 3E:
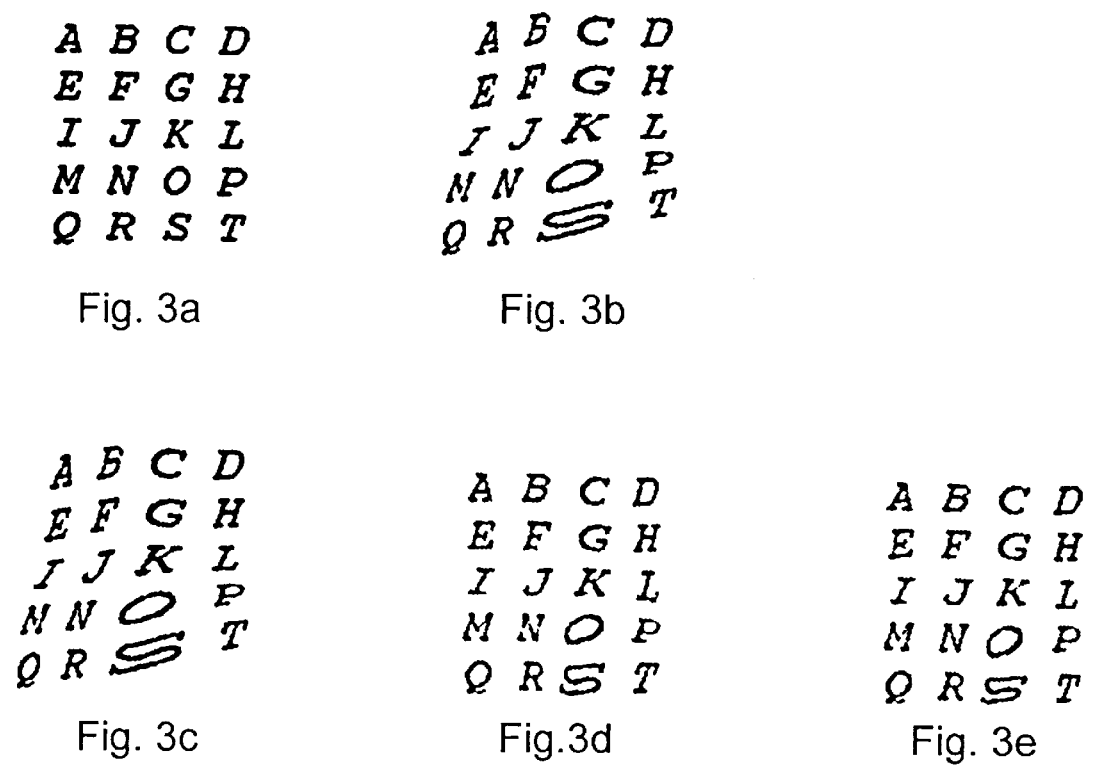

The localization process starts with the definition of a global transformation between the initial two images, the reference image of FIG. 3A and the target image of FIG. 3B. The target image of FIG. 3B is mapped to an intermediate image, FIG. 3C, by this global transformation. The intermediate image of FIG. 3C and the reference image of FIG. 3A are each partitioned into four windows. Then the corresponding windows are registered. This process continues recursively in each window and is iterated down to a predefined level of localization.

At localization level k, the images are partitioned into $2^k$ by $2^k$ windows. Let $L_{i,j}^k$ denote the local transformation centered at the (i,j)-window of the k-th level. First, the global transformation $T^0$ is computed between the input images I and J. The transformed image $I^1 = T^0(I)$ and the reference image J each are partitioned into four images: $I_{00}^1$, $I_{01}^1$, $I_{10}^1$, $I_{11}^1$ and $J_{00}^1$, $J_{01}^1$, $J_{10}^1$, $J_{11}^1$, respectively. The four local transformations $L_{i,j}^1$ are computed between the corresponding four pairs of images. The local transformations are then composed with the global transformation to yield $T_{i,j}^1$, the local composed transformations:

$$T_{i,j}^1 = L_{i,j}^1 T^0 \quad (18)$$

A global transformation $M^1$ is defined as the weighted average of these four transformations:

$$M^1 = \sum_0^1 \sum_0^1 w_{i,j} T_{i,j}^1 \quad (19)$$

where the $w_{i,j}$ are weights defined below.

Figure 4:
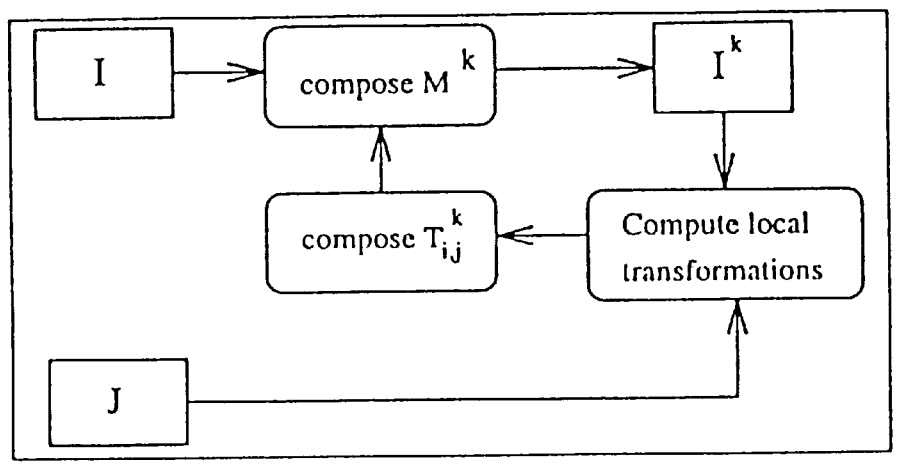
FIG. 4 shows the data flow of the localization process.

FIG. 4 shows the data flow of the localization process. In general, at level k, each local transformation $L_{i,j}^k$ is composed with the upper level transformation $$T_{i,j}^k = L_{i,j}^k T_{(\lfloor i/2 \rfloor, \lfloor j/2 \rfloor)}^{k-1} \quad (20)$$

and the global transformation $M^k$ is defined by $$M^k = \sum_0^{2^k-1} \sum_0^{2^k-1} w_{i,j} T_{i,j}^k \quad (21)$$

The transformed image $I^{k-1} = M^k(I)$ and the reference image J are then partitioned again and the process is repeated.

The local composed transformations are combined to form a global elastic mapping by an inverse distance weighted interpolation:

$$M^k(x, y) = \sum_i \sum_j w_{i,j}(x, y) T^k_{i,j}(x, y) \qquad (22)$$

where $w_{i,j}$ satisfies:

1. $w_{i,j}(x_{ij}, y_{ij}) = 1$, $$\sum_i \sum_j w_{i,j}(x, y) = 1, \text{ and}$$

$w_{i,j}(x,y) \geq 0$ and $(x_{ij}, y_{ij})$ is the sub-image center. Shepard (D. Shepard (1968), A two-dimensional interpolation function for irregularly spaced data, Proc. 23rd Natl. Conf. Of the ACM, ACM Press, N.Y., pp. 517–524) suggested the following function:

$$w_{i,j}(x, y) = \frac{d((x, y), (x_{i,j}, y_{i,j}))^{-u}}{\sum_i \sum_j d((x, y), (x_{i,j}, y_{i,j}))^{-u}} \qquad (23)$$

for any $(x,y) \neq (x_{ij}, y_{ij})$ and 1 otherwise. The Euclidean distance between points a and b is denoted by d(a,b), and the value of the exponent u determines the smoothness of the transformation. Preferably, u=2 to emphasize the local influence.

Note that the global transformation $M^k$ is neither an affine transformation nor a linear transformation, but a general elastic transformation. The computation of each local transformation $L_{i,j}^k$ is computed with the multiresolution and culling techniques.

The example in FIGS. 3A through 3E shows the importance of localization in cases where it is necessary to register images between which no affine transformation exists, for example, in cases where the deformation is local to a small part of one of the images. The global warped image of FIG. 3C has a normalized cross-correlation with the image of FIG. 3A of only 0.17. FIG. 3D shows the results of using four local registrations (one level of localization): the normalized cross-correlation between the images of FIGS. 3A and 3D is 0.64. FIG. 3E shows the results of using sixteen local registrations (two levels of localization): the normalized cross-correlation between the images of FIGS. 3A and 3E is 0.81.

Although the preferred mode of localization is by halving the linear dimension of the subwindow at every localization level, as described above, the scope of the present invention includes all ways of subdividing the reference and target images into nonoverlapping subimages, for example, dividing the linear dimensions of the subwindow by an integer greater than 2 at every localization level.

Extension to Higher Dimensions

As was mentioned above, the sampled ultrasonic volumes are deformed during acquisition. Because unavoidable deformation is inherently a 3D deformation, the warp transformation that can align the deformed volume must be a true 3D warp. Otherwise, it would be like trying to register two slices lying on different planes.

The extension of the gradient method to 3D is straightforward. All that is required is to treat the third dimension analogously to the other two dimensions. Define a 3D affine transformation:

$$\begin{bmatrix} s \\ t \\ w \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{bmatrix} 1 \\ x \\ y \\ z \end{bmatrix} \qquad (24)$$

Assume, as in the 2D case, that I and J are smooth differentiable functions from $R^3$ to R. What is needed is an affine transformation T(x,y,z)=(s,t,w) such that I(x,y,z)=J(s,t,w). Define the displacements dx=s−x, dy=t−y, and dz=w−z, so:

$$I(x,y,z) = J(x+dx, y+dy, z+dz) \qquad (25)$$

If the displacement vector (dx,dy,dz) is small enough to be approximated by the linear term of a Taylor expansion, then $$J(x+dx,y+dy,z+dz) = J(x,y,z) + dx\partial_x J(x,y,z) + dy\partial_y J(x,y,z) + dz\partial_z J(x,y,z) \qquad (26)$$

Because $dx = u - x = a_{11} + (a_{12}-1)x + a_{13}y + a_{14}z$ $dy = v - y = a_{21} + a_{22}x + (a_{23}-1)y + a_{24}z$ $dz = w - z = a_{31} + a_{32}x + a_{33}y + (a_{34}-1)a \qquad (27)$ it follows that $I(x,y,z) = J(x,y,z) + a_{11} + (a_{12}-1)x + a_{13}y + a_{14}z)\partial_x J(x,y,z) + (a_{21} + a_{22}x + (a_{23}-1)y + a_{24}z)\partial_y J(x,y,z) + (a_{31} + a_{32}x + a_{33}y + (a_{34}-1)z)\partial_z J(x,y,z) \qquad (28)$ Because it is assumed that Equation (28) holds for most of the voxels, there are obtained, as in the 2D case, a large number of equations which are solved by the pseudo inverse method, similar to the 2D case (Equation (9)). The multiresolution, culling, and localization techniques are extended and applied in a similar way. In particular, localization is done using 3D nonoverlapping subimages, preferably by partitioning the images initially into eight subimages, and, in each succeeding level of localization, partitioning each of the subimages of the previous level into eight subimages.

This formalism is easily extended by one skilled in the art to images of dimensionality higher than 3, and the scope of the present invention includes the registration of images of dimensionality higher than 3. In the localization step for images of dimensionality D, if the subimages are obtained by dividing the linear dimensions of the parent images by an integer N at every localization level, then each parent image is divided into $N_{2D}$ subimages at every localization level.

Rigid Registration

The gradient method defines an elastic transformation which warps the target volume to agree with the geometry of the reference volume. The method relies on the assumption that the two volumes are relatively close. Given two volumes, it is necessary to recover their relative positions. With 2D images this can be done manually, but it is almost impossible to have the same success in 3D because of the lack of proper 3D user interfaces.

A 3D rigid transformation is a function of six variables, three for translation and three for orientation. Unlike the elastic gradient method, here an indirect method, i.e., a search method, is used. Because the two volumes are of the same type, a cross-correlation can be used as a similarity measure. The search for a global maximum is carried out in a six dimensional domain The problem of finding a global maximum for a multi-dimensional function is well known. This is a classic problem of optimization in which the main difficulty is to avoid converging to some local maximum. There are many solutions for non linear systems, such as Newton or Taylor techniques, which assume an initial proximity to the global solution, because they do not distinguish between global and local extrema. The preferred method in the present invention is the well established technique of "simulating annealing", which can elude local extrema. The parameters of the technique require data-dependent tuning, but this can be done easily by one skilled in the art. A simulating annealing method can also be applied to search for a non-rigid transformation. However, because search methods are sensitive to the number of parameters, the search time is impractical.

Seamless Mosaicing

Figure 5:
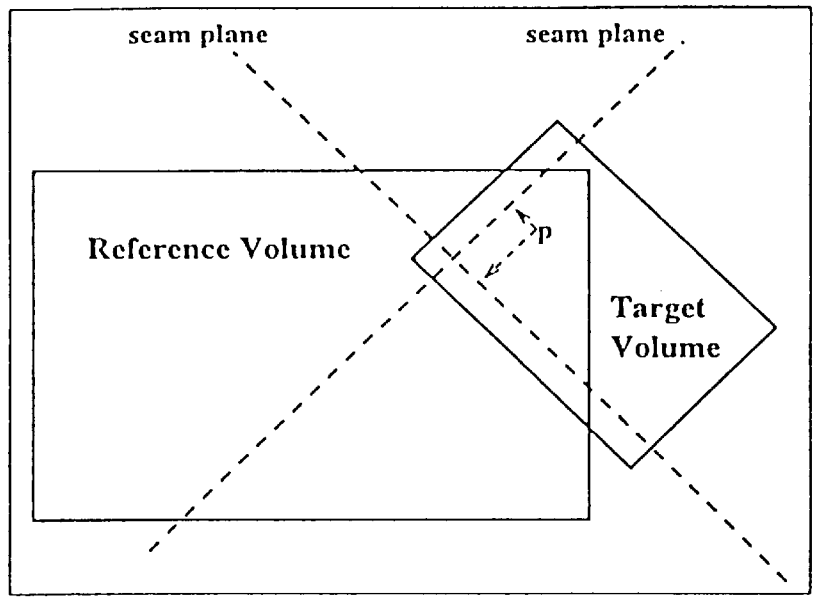
FIG. 5 shows schematically the overlap of a target volume and a reference volume, including two seam planes.
Figure 6:
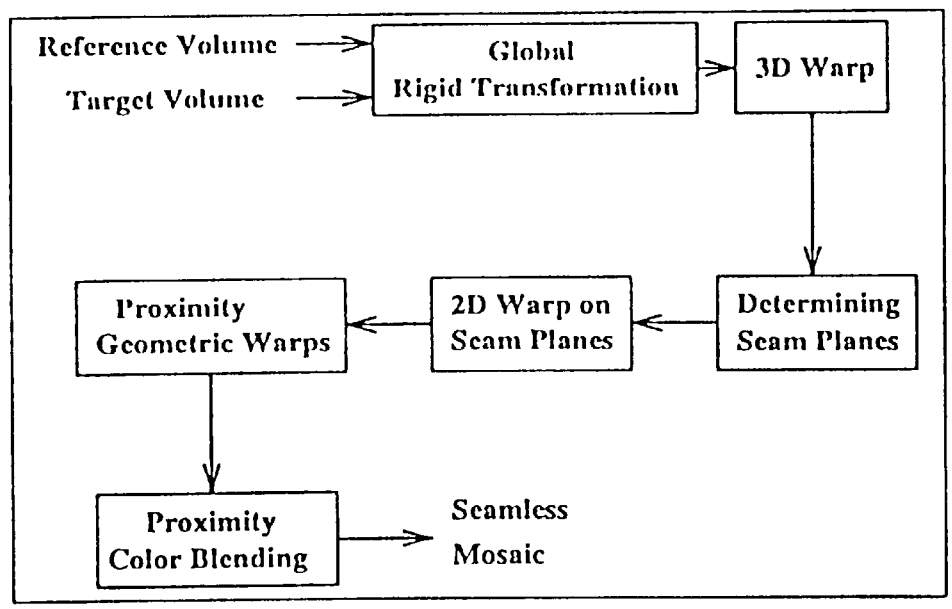
FIG. 6 shows the volume mosaicing pipeline.

After the coarse rigid alignment has been applied, the location of the target volume in terms of the reference volume coordinate system is known, as shown in FIG. 5. This defines a clipping box contained within the overlapping portion of the two volumes. The target volume is warped by the 3D gradient method based on the context of two subvolumes, one from each volume, bounded by the clipping box. These two steps, i.e., rigid alignment and the 3D elastic warp, are the first two stages along the mosaicing pipeline illustrated in FIG. 6. Equation (22) is assumed valid throughout the target volume, not just within the clipping box. The rest of the pipeline stitches the warped volume over the reference volume.

The warped target volume has to be composed over the reference volume in a seamless way. In most cases, adjacent volumes have different intensities, mainly because of directional variations. Some parts in one volume bear no resemblance to the corresponding part of the other volume or often do not exist. This requires the application of a 2D registration of the two slices at the seam face to further refine the misalignments at the connecting planes, and to blend (cross-dissolve) the two volumes to blur away the seam faces.

The determination of the seam planes is not as simple as it may seem. The seam plane should pierce the clipping volume but not necessarily in the middle. Because we apply a 2D registration along this plane, it should contain significant information for a valid registration. A simple heuristic may be applied to look for the slice parallel to the volume face which has the most meaningful pixels, where a meaningful pixel is defined as a pixel whose close neighborhood has a variation above some predefined threshold. Note, that there may be more than one seam plane. In many cases there are three seam planes, and if the target volume is set deep into the reference volume there may be up to six seam planes.

Once the seam planes are determined, two slices are extracted, one from each volume for each seam plane. The images of the slices are registered by the 2D version of the elastic multiresolution gradient method described above. The 2D registration defines a set of transformations $M_i$ (Equation (21)) one for each seam plane. Then, the target volume is deformed by a weighted blend of the 2D transformations defined as follows. Let p be an arbitrary point in the target volume and $p_i$ the closest point (the orthogonal projection) on the i-th seam plane. Let $w_i$ be an inverse power of the Euclidean distance between p and $p_i$:

$$w_i = \frac{1}{|p - p_i|^u} \quad (30)$$

where the exponent u controls the distance decay. Then $$M(p) = \sum_i \frac{w_i}{\sum_j w_j} M_i(p_i) \quad (31)$$

The blended registration function M improves the geometric registration in the proximity of the seam planes and reduces the distortions away from them. The gray levels of the two images are blended by a similar weighted sum to give the final gray level at point p.

While the invention has been described with respect to a limited number of embodiments, it will be appreciated that many variations, modifications and other applications of the invention may be made.

What is claimed is:

1. A method for blending a three-dimensional target image with a three-dimensional reference image, the target image including a plurality of points, the method comprising the steps of:
  (a) determining at least one seam plane shared by the target image and the reference image;
  (b) for each of said at least one seam plane:
    (i) extracting an input target slice from the target image along said seam plane,
    (ii) extracting an input reference slice from the reference image along said seam plane,
    (iii) subdividing the input target slice into a plurality of target subslices,
    (iv) subdividing the input reference slice into a plurality of reference subslices, there being a one-to-one correspondence between said reference subslices and said target subslices,
    (v) for each of said target subslices, determining a local transformation that warps said target subimage to match said corresponding reference subimage,
    (vi) recursively performing both said subdividing and said determining of said local transformation at a plurality of levels of localization, said recuring further including the steps of:
      (A) for each of said target subslices, composing said local transformation with a prior transformation, thereby obtaining a local composed transformation, and
      (B) forming a weighted sum of said local composed transformations, thereby obtaining a global transformation;
  (c) applying a weight sum of said at least one global transformation to at least one of the points.

2. A method for mosaicing a three-dimensional target image with a three-dimensional reference image, comprising the steps of:
  (a) registering the target image with the reference image by steps including:
    (i) rigidly transforming the target image to match the reference image, thereby providing a rigidly transformed target image, and
    (ii) warping said rigidly transformed target image to match the reference image by steps including:
      (A) subdividing the rigidly transformed target image into a plurality of target subimages, (B) subdividing the reference image into a plurality of reference subimages, there being a one-to-one correspondence between said reference subimages and said target subimages, and (C) for each of said target subimages, determining a local transformation that warps said target subimage to match said corresponding reference subimage, thereby providing a registered target image;

(b) determining at least one seam plane shared by the registered target image and the reference image; and (c) blending the registered target image and the reference image along said at least one seam plane, by steps including, for each of said at least one seam plane:

(i) extracting a target slice from said registered target image along said each seam plane, (ii) extracting a reference slice from said reference image alone said each seam plane, and (iii) registering said target slice with said reference slice.

3. A method for mosaicing a three-dimensional target image with a three-dimensional reference image, comprising the steps of:

(a) registering the target image with the reference image, thereby providing a registered target image;

(b) determining at least one seam plane shared by the registered target image and the reference image; and (c) blending the registered target image and the reference image along said at least one seam plane by steps including:

(i) for each of said seam planes:

(A) extracting a target slice from said registered target image along said each seam plane, (B) extracting a reference slice from said reference image along said each seam plane, and (C) determining a two-dimensional transformation that registers said target slice with said reference slice, and (ii) applying a weighted sum of said two-dimensional transformations to said registered target image.

* * * * *